United States Patent
Sakurada et al.

(10) Patent No.: US 9,299,486 B2
(45) Date of Patent: Mar. 29, 2016

(54) PERMANENT MAGNET, AND MOTOR AND POWER GENERATOR USING THE SAME

(71) Applicant: KABUSHIKI KAISHA TOSHIBA, Minato-ku, Tokyo (JP)

(72) Inventors: Shinya Sakurada, Tokyo (JP); Yosuke Horiuchi, Tokyo (JP); Tsuyoshi Kobayashi, Kanagawa-ken (JP); Keiko Okamoto, Kanagawa-ken (JP); Masaya Hagiwara, Kanagawa-ken (JP); Makoto Matsushita, Tokyo (JP); Masaki Endo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 13/799,335

(22) Filed: Mar. 13, 2013

(65) Prior Publication Data
US 2013/0257209 A1    Oct. 3, 2013

(30) Foreign Application Priority Data
Mar. 30, 2012  (JP) ................. 2012-079182

(51) Int. Cl.
*H01F 1/10* (2006.01)
*H02K 1/02* (2006.01)
*H01F 1/055* (2006.01)

(52) U.S. Cl.
CPC .................. *H01F 1/10* (2013.01); *H01F 1/055* (2013.01); *H02K 1/02* (2013.01)

(58) Field of Classification Search
CPC .............. H01F 1/10; H01F 1/055; H02K 1/02
See application file for complete search history.

(56) References Cited

U.S. PATENT DOCUMENTS

| 4,746,378 A | 5/1988 | Wysiekierski et al. |
|---|---|---|
| 8,177,921 B2 | 5/2012 | Odaka et al. |
| 2011/0200839 A1 | 8/2011 | Marinescu et al. |
| 2011/0241810 A1 | 10/2011 | Horiuchi et al. |
| 2012/0146444 A1 | 6/2012 | Horiuchi et al. |

(Continued)

FOREIGN PATENT DOCUMENTS

| CN | 101652822 | 2/2010 |
|---|---|---|
| JP | 2011-216716 | 10/2011 |

(Continued)

OTHER PUBLICATIONS

English Abstract and English Machine Translation of Horiuchi et al. (JP 2011-216716) (Oct. 27, 2011).*

(Continued)

*Primary Examiner* — Jessee Roe
(74) *Attorney, Agent, or Firm* — Amin, Turocy & Watson, LLP

(57) ABSTRACT

In one embodiment, a permanent magnet includes a magnet main body and a surface portion provided on a surface of the magnet main body. The magnet main body has a composition expressed by a composition formula 1: $R(Fe_{p1}M_{q1}Cu_{r1}Co_{1-p1-q1-r1})_{z1}$. The surface portion has a composition expressed by a composition formula 2: $R(Fe_{p2}M_{q2}Cu_{r2}Co_{1-p2-q2-r2})_{z2}$. In the composition formulas 1 and 2, R is at least one element selected from rare earth elements, M is at least one element selected from Ti, Zr and Hf, p1 and p2 are 0.25 to 0.45, q1 and q2 are 0.01 to 0.05, r1 and r2 are 0.01 to 0.1, z1 is 6 to 9, and z2 satisfies $0.8 \leq z2/z1 \leq 0.995$.

10 Claims, 2 Drawing Sheets

(56) References Cited

U.S. PATENT DOCUMENTS

| | | |
|---|---|---|
| 2012/0242180 A1 | 9/2012 | Horiuchi et al. |
| 2013/0076184 A1 | 3/2013 | Horiuchi et al. |
| 2013/0082559 A1 | 4/2013 | Hagiwara et al. |
| 2013/0241333 A1 | 9/2013 | Horiuchi et al. |
| 2015/0155082 A1 | 6/2015 | Marinescu et al. |

FOREIGN PATENT DOCUMENTS

| | | |
|---|---|---|
| WO | 2011/121647 | 10/2001 |
| WO | 2011-016089 | 2/2011 |
| WO | 2011/103104 | 8/2011 |

OTHER PUBLICATIONS

Office Action for Chinese Patent Application No. 201310036519.0 Dated Feb. 2, 2015, 9 pages.

Japanese Office Action for Japanese Application No. 2014-143592 mailed on Jun. 2, 2015.

Japanese Office Action for Japanese Application No. 2014-143593 mailed on Jun. 2, 2015.

\* cited by examiner

PERMANENT MAGNET, AND MOTOR AND POWER GENERATOR USING THE SAME

CROSS-REFERENCE TO RELATED APPLICATION

This application is based upon and claims the benefit of priority from Japanese Patent Application No. 2012-079182, filed on Mar. 30, 2012; the entire contents of which are incorporated herein by reference.

FIELD

Embodiments disclosed herein generally relate to a permanent magnet, and a motor and a power generator using the same.

BACKGROUND

As a high-performance permanent magnet, there have been known rare-earth magnets such as a Sm—Co based magnet and a Nd—Fe—B based magnet. When a permanent magnet is used for a motor of a hybrid electric vehicle (HEV) or an electric vehicle (EV), the permanent magnet is required to have heat resistance. In a motor for HEV or EV, a permanent magnet whose heat resistance is enhanced by dysprosium (Dy) substituting for part of neodymium (Nd) of the Nd—Fe—B based magnet is used. Since Dy is one of rare elements, there is a demand for a permanent magnet whose heat resistance is enhanced without using Dy. Further, in order to improve efficiency of a motor and a power generator, there is a demand for improvement in a coercive force and magnetic flux density of the permanent magnet.

It is known that, because the Sm—Co based magnet has a high Curie temperature, it exhibits excellent heat resistance without using Dy. The Sm—Co based magnet is drawing attention as a permanent magnet capable of realizing a good motor characteristic under high temperatures. A $Sm_2Co_{17}$ type magnet among the Sm—Co based magnets is expected as a permanent magnet used for a motor and a power generator because of its high coercive force and high magnetic flux density. However, it is becoming clear that, when a conventional $Sm_2Co_{17}$ type magnet is applied to a motor and a power generator, demagnetization is likely to occur in a surface portion of the magnet at the time of the operation under high temperatures. Therefore, there is a demand for a $Sm_2Co_{17}$ type magnet in which the high-temperature demagnetization in the surface portion is suppressed.

DETAILED DESCRIPTION

According to one embodiment, there is provided a permanent magnet including: a magnet main body; and a surface portion provided on a surface of the magnet main body. The magnet main body has a composition expressed by a following composition formula 1. The surface portion has a composition expressed by a following composition formula 2.

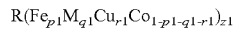   composition formula 1:

where, R is at least one element selected from rare-earth elements, M is at least one element selected from Ti, Zr, and Hf, p1 is a number satisfying $0.25 \leq p1 \leq 0.45$ (atomic ratio), q1 is a number satisfying $0.01 \leq q1 \leq 0.05$ (atomic ratio), r1 is a number satisfying $0.01 \leq r1 \leq 0.1$ (atomic ratio), and z1 is a number satisfying $6 \leq z1 \leq 9$ (atomic ratio).

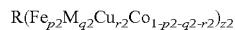   composition formula 2:

where, R is at least one element selected from rare-earth elements, M is at least one element selected from Ti, Zr, and Hf, p2 is a number satisfying $0.25 \leq p2 \leq 0.45$ (atomic ratio), q2 is a number satisfying $0.01 \leq q2 \leq 0.05$ (atomic ratio), r2 is a number satisfying $0.01 \leq r2 \leq 0.1$ (atomic ratio), and z2 is a number satisfying $0.8 \leq z2/z1 \leq 0.995$ (atomic ratio).

Figure 1:
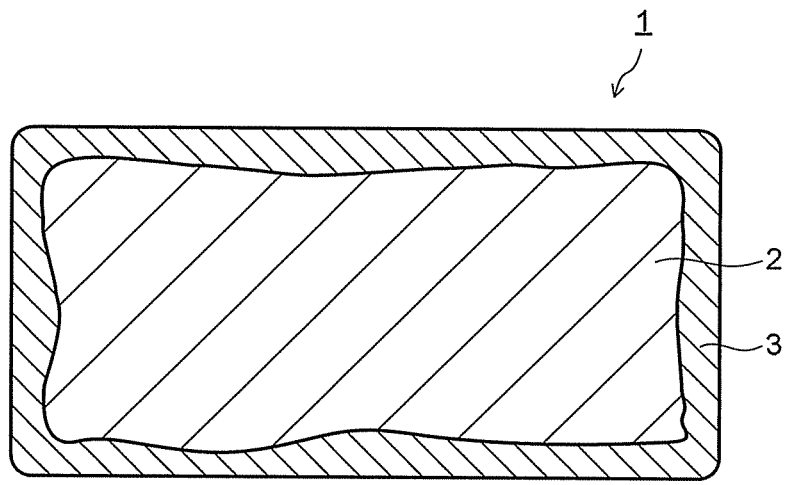
FIG. 1 is a cross-sectional view showing a permanent magnet according to an embodiment.

Hereinafter, the permanent magnet of the embodiment will be described in detail. FIG. 1 is a sectional view showing a structure of the permanent magnet of the embodiment. The permanent magnet 1 shown in FIG. 1 includes a magnet main body 2, and a surface portion 3 provided on a surface of the magnet main body 2. The magnet main body 2 has the composition expressed by the aforesaid composition formula 1. The surface portion 3 has the composition expressed by the aforesaid composition formula 2.

In the composition formula (1) and the composition formula (2), as the element R, at least one element selected from rare-earth elements including yttrium (Y) is used. The element R brings about great magnetic anisotropy and gives a high coercive force to the permanent magnet. As the element R, at least one element selected from samarium (Sm), cerium (Ce), neodymium (Nd), and praseodymium (Pr) is preferably used, and the use of Sm is especially desirable. When 50 at % or more of the element R is Sm, it is possible to enhance performance, especially the coercive force, of the permanent magnet with good reproducibility. Further, 70 at % or more of the element R is desirably Sm.

Iron (Fe) is mainly responsible for the magnetization of the permanent magnet. By compounding a large amount of Fe, it is possible to increase saturation magnetization of the permanent magnet. When the content of Fe is excessively large, the coercive fore lowers due to the precipitation of an α-Fe phase and the like. Each of the contents p1, p2 of Fe in the composition formula (1) and the composition formula (2) falls within a range of 0.25 to 0.45. Setting the contents p1, p2 of Fe to 0.25 or more makes it possible to enhance the saturation magnetization of the permanent magnet. The contents p1, p2 of Fe preferably fall within a range of 0.28 to 0.40, and more preferably within a range of 0.30 to 0.36.

As the element M, at least one element selected from titanium (Ti), zirconium (Zr), and hafnium (Hf) is used. Compounding the element M makes it possible for a large coercive force to be exhibited even when the Fe concentration of the composition is high. Each of the contents q1, q2 of the element M in the composition formula (1) and the composition formula (2) falls within a range of 0.01 to 0.05. When q1 and q2 are over 0.05, the magnetization greatly lowers. When q1 and q2 are less than 0.01, the effect of increasing the Fe concentration is small. The contents q1, q2 of the element M preferably fall within a range of 0.01 to 0.03, and more preferably within a range of 0.015 to 0.25.

The element M may be any of Ti, Zr, and Hf, but preferably contains at least Zr. Especially, when 50 at % or more of the element M is Zr, it is possible to improve the effect of enhancing the coercive force of the permanent magnet. On the other hand, Hf in the element M is especially expensive, and therefore, even when Hf is used, its amount used is preferably small. The content of Hf is preferably set to less than 20 at % of the element M.

Copper (Cu) is an element essential for causing a Sm—Co based permanent magnet to exhibit a high coercive force. Each of the contents r1, r2 of Cu in the composition formula (1) and the composition formula (2) falls within a range of 0.01 to 0.1. When r1 and r2 are over 0.1, the magnetization greatly lowers, and when r1 and r2 are less than 0.01, it is difficult to obtain a high coercive force. The contents r1, r2 of Cu preferably fall within a range of 0.03 to 0.07, and more preferably within a range of 0.04 to 0.06.

Cobalt (Co) is an element not only responsible for the magnetization of the permanent magnet but also necessary for causing a high coercive force to be exhibited. Further, when a large amount of Co is contained, a Curie temperature becomes high, which can improve thermal stability of the permanent magnet. When the content of Co is too small, it is not possible to sufficiently obtain these effects. However, when the content of Co is excessively large, a ratio of the Fe content relatively lowers, which is liable to deteriorate the magnetization. Therefore, the content of Co is set in consideration of the contents of the element R, the element M, and Cu so that the contents p1, p2 of Fe in the composition formulas (1) and (2) satisfy the aforesaid range.

Part of Co may be substituted for by at least one element A selected from nickel (Ni), vanadium (V), chromium (Cr), manganese (Mn), aluminum (Al), silicon (Si), gallium (Ga), niobium (Nb), tantalum (Ta), and tungsten (W). The substitution by the element A for Co may be applied to one of the composition formula (1) and the composition formula (2) or may be applied to the both. The substitution element A contributes to improvement in magnetic property, for example, the coercive force. However, the excessive substitution by the element A for Co is liable to cause the deterioration of the magnetization, and therefore, an amount of the substitution by the element A is preferably 20 at % of Co or less. Note that it is permissible that the material of the magnet of the embodiment contains inevitable impurities such as an oxide.

In the composition formula (1), an atomic ratio of the element R and the other elements (Fe, M, Cu, Co) falls within a range of 1:6 to 1:9. That is, a value (atomic ratio) of $z_1$ in the composition formula (1) is set to a range of 6 to 9. When the value of $z_1$ is less than 6, in other words, when a ratio of the content of the element R is too large, the magnetization greatly lowers and sufficient magnetic flux density cannot be obtained. When the value of $z_1$ is over 9, in other words, when the ratio of the content of the element R is too small, a large amount of the α-Fe phase precipitates, and a sufficient coercive force cannot be obtained. The value of $z_1$ is preferably set to a range of 7.5 to 8.5, and more preferably a range of 7.7 to 8.3. An atomic ratio of the element R and the other elements (Fe, M, Cu, Co) in the composition formula (2) will be described in detail later.

The permanent magnet 1 of the embodiment is, for example, worked into a rectangular parallelepiped shape, and thereafter used in a state of being buried in a motor or a power generator. In such a case, when the motor or the power generator is exposed to high temperatures, magnetization reversal is likely to occur from the surface portion of the permanent magnet where a demagnetizing magnetic field concentrates. When such high-temperature demagnetization occurs, performance of the motor or the power generator greatly lowers. Especially, because the Sm—Co based magnet includes highly volatile Sm, Sm evaporates from the surface of the magnet during later-described manufacturing steps or the like of the permanent magnet, which is liable to make the Sm concentration in the surface portion smaller than that in the interior of the magnet. The Sm—Co based magnet, when the Sm concentration of its surface portion lowers, gets into a state disadvantageous for the high-temperature demagnetization.

The present inventors have found out that the high-temperature demagnetization of a conventional Sm—Co based magnet is ascribable to the aforesaid decrease of the concentration of the element R such as Sm in the surface portion. Therefore, in the permanent magnet 1 of the embodiment, the surface portion 3 having the composition expressed by the composition formula 2 is provided on the surface of the magnet main body (magnet interior) 2 having the composition expressed by the composition formula 1. The composition in the surface portion 3 is characterized in the value of $z_2$ representing the atomic ratio of the other elements (Fe, M, Cu, Co) to the element R. The value of $z_2$ in the composition formula 2 is set so as to satisfy $0.8 \leq z_2/z_1 \leq 0.995$. By providing the surface portion 3 having a composition where such $z_2$ is satisfied on the surface of the magnet main body 2, it is possible to suppress the high-temperature demagnetization in the surface portion of the Sm—Co based permanent magnet 1.

That the ratio ($z_2/z_1$) of the value of $z_2$ in the composition formula 2 to the value of $z_1$ in the composition formula 1 is less than 1 means that in the composition formula 2, the atomic ratio of the elements (Fe, M, Cu, Co) other than the element R is smaller than that in the composition formula 1. That is, compared with the magnet main body (magnet interior) 2, the surface portion 3 has a composition in which the content ratio of the element R is large, in other words, a composition in which the concentration of the element R is high. By thus making the concentration of the element R in the surface portion 3 higher than that in the magnet main body (magnet interior) 2, it is possible to suppress the magnetization reversal in the surface portion 3 at the time of the operation under high temperatures and based on this, and it is possible to suppress a decrease in magnetic flux. That is, it is possible to suppress the high-temperature demagnetization of the permanent magnet 1. Therefore, it is possible to provide the permanent magnet 1 capable of maintaining a good property even when it is assembled in a motor or a power generator to be operated under high temperatures.

In order to obtain the effect of making the concentration of the element R in the surface portion 3 higher than that in the magnet main body 2, the value of $z_2$ in the composition formula 2 is set so that the ratio $z_2/z_1$ becomes 0.995 or less. By setting the ratio $z_2/z_1$ to 0.995 or less, it is possible to effectively suppress the high-temperature demagnetization of the permanent magnet 1. In order to more effectively obtain the effect of suppressing the high-temperature demagnetization, the ratio $z_2/z_1$ is preferably 0.95 or less. However, when the ratio $z_2/z_1$ is too low, the concentration of the element R in the surface portion 3 becomes too high, which greatly deteriorates the magnetization of the surface portion 3. As a result, the magnetic flux density of the whole permanent magnet 1 lowers and the magnetic property deteriorates. Therefore, the ratio $z_2/z_1$ is set to 0.8 or more. The ratio $z_2/z_1$ is preferably 0.85 or more.

In order to only eliminate the influence by the evaporation of the element R such as Sm from the surface of the magnet in the manufacturing steps and so on of the permanent magnet, it is only necessary to polish the surface portion of the permanent magnet when in use and remove a portion where the concentration of the element R is low. However, excessively polishing the permanent magnet lowers yields, leading to an increase in manufacturing cost of the permanent magnet. Moreover, only by polishing the surface portion of the permanent magnet, it is not possible to make the concentration of the element R in the surface portion higher than that in the interior. Regarding such a problem, by providing in advance the surface portion 3 where the concentration of the element R is higher than that in the interior (magnet main body) 2, it is possible to suppress the high-temperature demagnetization of the permanent magnet 1 with good reproducibility. Further, it is possible to reduce a polishing amount of the surface portion of the permanent magnet, leading to a reduction in the manufacturing cost.

In the surface portion 3 where the concentration of the element R is higher than that in the magnet main body 2, it is further preferable that the concentration of the element M is lower than that in the magnet main body 2. That is, a value of q2 in the composition formula 2 preferably satisfies 0.5≤q2/q1≤0.95. Making the concentration of the element M in the surface portion 3 lower than that in the magnet main body 2 makes it possible to further enhance the effect of suppressing the high-temperature demagnetization of the permanent magnet 1. A region having the composition in which the concentration of the element M is lower than that in the magnet main body 2 may be provided on the whole surface portion 3 or may be provided on part of the surface portion 3. It is preferable that at least part of the surface portion 3 has the composition in which the value of q2 in the composition formula 2 satisfies 0.5≤q2/q1≤0.95.

In order to obtain the effect of suppressing the high-temperature demagnetization by making the concentration of the element M in the surface portion 3 lower than that in the magnet main body 2, the value of q2 in the composition formula 2 is preferably set so that the ratio q2/q1 becomes 0.95 or less. Setting the ratio q2/q1 to 0.95 or less makes it possible to enhance the effect of suppressing the high-temperature demagnetization of the permanent magnet 1. In order to further enhance the effect of suppressing the high-temperature demagnetization, the ratio q2/q1 is more preferably 0.9 or less. However, when the ratio q2/q1 is too low, the α-Fe phase precipitates to the surface portion 3, which is liable to lower the coercive force. Therefore, the ratio q2/q1 is preferably 0.5 or more, and more preferably 0.7 or more.

In the permanent magnet 1 of this embodiment, the magnet main body (magnet interior) 2 and the surface portion 3 are defined as follows. First, the composition is measured in the interior and the surface portion of a cross section cut at a center portion of the longest side in a surface having the largest area of the permanent magnet 1, perpendicularly to the side (perpendicularly to a tangent of the center portion in a case of a curve). Measurement points are as follows. Reference lines 1 drawn from ½ positions of respective sides in the aforesaid cross section as starting points up to end portions toward an inner side perpendicularly to the sides and reference lines 2 drawn from centers of respective corners as starting points up to end portions toward the inner side at ½ positions of interior angles of the corner portions are provided, and 1% positions of the lengths of the reference lines from the starting points of these reference lines 1, 2 are defined as the surface portion 3 and 40% positions are defined as the interior 2. Note that, when the corner portions have curvature because of chamfering or the like, points of intersection of extensions of adjacent sides are defined as end portions of the sides (centers of the corner portions). The measurement points are positions determined not based on the points of intersection but based on portions in contact with the reference lines.

When the measurement points are set as above, in a case where the cross section is, for example, a quadrangle, the number of the reference lines is totally eight, with the four reference lines 1 and the four reference lines 2, and the number of the measurement points is eight in each of the surface portion 3 and the interior 2. In this embodiment, the eight points in each of the surface portion 3 and the interior 2 all preferably have the aforesaid composition range, but at least four points or more in each of the surface portion 3 and the interior 2 need to have the aforesaid composition range. In this case, a relation between the surface portion 3 and the interior 2 of one reference line is not defined. Composition analysis is conducted with, for example, SEM-EDX (energy-dispersive X-ray spectroscopy method).

The permanent magnet of this embodiment preferably includes a metallic structure including a phase separation structure formed by applying aging a $TbCu_7$ crystal phase (a crystal phase having a $TbCu_7$ structure/1-7 phase) being a high-temperature phase as a precursor. The phase separation structure includes a cell phase having a $Th_2Zn_{17}$ crystal phase (a crystal phase having a $Th_2Zn_{17}$ structure/2-17 phase), and a cell wall phase formed to surround a periphery of the cell phase and having of a $CaCu_5$ crystal phase (a crystal phase having a $CaCu_5$ structure/1-5 phase). The metallic structure of the permanent magnet may include a crystal phase other than the 2-17 phase and the 1-5 phase or an amorphous phase.

Domain wall energy of the 1-5 phase (cell wall phase) precipitating to grain boundaries of the 2-17 phase (cell phase) is larger than domain wall energy of the 2-17 phase, and this difference in the domain wall energy becomes a barrier to domain wall displacement. It is thought that, because in the $Sm_2Co_{17}$ type magnet, the 1-5 phase or the like large in the domain wall energy works as a pinning site, the domain wall pinning-type coercive force is exhibited. It is thought that the difference in the domain wall energy is mainly caused by the difference in the Cu concentration. It is thought that the coercive force is exhibited if the Cu concentration in the cell wall phase is higher than the Cu concentration in the cell phase. Therefore, the cell wall phase preferably has a Cu concentration 1.2 times the Cu concentration in the cell phase or more. This makes it possible for the cell wall phase to fully function as the pinning site of the domain wall, which makes it possible to obtain a sufficient coercive force.

A typical example of the cell wall phase existing to surround the cell phase is the aforesaid 1-5 phase, but the cell wall phase is not limited to this. When the cell wall phase has the Cu concentration 1.2 times the Cu concentration of the cell phase or more, the cell wall phase can sufficiently function as the pinning site, which makes it possible to obtain a high coercive force. Therefore, the cell wall phase only needs to be the aforesaid Cu-rich phase. Besides the 1-5 phase, examples of the cell wall phase are the 1-7 phase being the high-temperature phase (structure before the phase separation), and a precursor phase of the 1-5 phase that is generated in an initial stage of the two-phase separation of the 1-7 phase.

A form of the permanent magnet of the embodiment is not necessarily limited but the permanent magnet is preferably a sintered magnet. The permanent magnet of the embodiment preferably includes the magnet main body (magnet interior) 2 which is made of a sintered compact having the composition expressed by the composition formula 1, and the surface portion 3 provided on the surface of the magnet main body (sintered compact) 2. The surface portion 3 may be formed at the same time when the sintered compact as the magnet main body 2 is formed or may be formed by later-described heat treatment or the like after the sintered compact is formed. A method of forming the surface portion 3 is not particularly limited, and it is only necessary that the surface portion 3 differs in the concentration of the element R and the concentration of the element M from the magnet main body (magnet interior) 2.

The permanent magnet of this embodiment is fabricated as follows, for instance. First, alloy powder containing predetermined amounts of elements is fabricated. The alloy powder is prepared by grinding an alloy ingot obtained through the casting of molten metal by, for example, an arc melting method or a high-frequency melting method. The alloy powder may be prepared by fabricating an alloy thin strip in a flake form by a strip cast method and thereafter grinding the alloy thin strip. The alloy powder or the alloy before being ground may be heat-treated for homogenization when necessary. A jet mill, a ball mill, or the like is used for grinding the flake or the ingot. The grinding is preferably performed in an inert gas atmosphere or an organic solvent in order to prevent oxidization of the alloy powder.

Next, the alloy powder is filled in a mold installed in an electromagnet or the like and is press-formed while a magnetic field is applied, whereby a compressed powder body whose crystal axes are oriented is fabricated. By sintering this compressed powder body under appropriate conditions, it is possible to obtain a dense sintered compact. A sintering temperature preferably falls within a range of 1100° C. to 1300° C., and a sintering time preferably falls within a range of 0.5 hour to 15 hours. In order to prevent oxidation, the sintering of the compressed powder body is preferably performed in a vacuum atmosphere or an inert gas atmosphere of argon gas.

Next, solution treatment and aging are applied to the obtained sintered compact to control the crystal structure. The solution treatment is treatment to obtain the 1-7 phase being the precursor of the phase separation structure and is preferably performed by keeping a temperature falling within a range of 1110° C. to 1200° C. for 0.5 hour to eight hours. The aging is treatment to control the crystal structure to enhance the coercive force of the magnet. In the aging, it is preferable that after the temperature is kept at 700° C. to 900° C. for 0.5 hour to eighty hours, the temperature is gradually decreased to 400° C. to 650° C. at a cooling rate of 0.2° C./minute to 2° C./minute, and is subsequently decreased to room temperature. In order to prevent oxidation, the solution treatment and the aging are preferably performed in the vacuum atmosphere or the inert gas atmosphere of Ar gas or the like.

The permanent magnet (sintered magnet) obtained by the above-described manufacturing method has a single composition similarly to a conventional Sm—Co based magnet. Next, methods of making the magnet main body (interior) 2 and the surface portion 3 different in the concentrations of the element R and the element M will be described. As a method of giving the concentration difference of the element R, a method of diffusing the element R by heat treatment after depositing the element R on a surface of the aforesaid sintered compact is effective. When Sm is used as the element R, by heating in a state that powder having a high Sm concentration is disposed near the sintered compact, it is possible to deposit Sm on the surface of the sintered compact since Sm has a high vapor pressure under high temperatures. Alternatively, the element R may be diffused by the heat treatment after compound powder of a fluoride, an oxide, or the like containing the element R is applied on the surface of the sintered compact.

The heat treatment performed after the deposition of the element R or the application of the compound powder containing the element R is preferably carried out under such conditions that the element R sufficiently diffuses from the surface of the sintered compact and a compound in which the concentration of the element R is high is generated. The heat treatment is preferably performed under conditions of, for example, a 500° C. to 1000° C. temperature and 0.1 hour to ten hours. Consequently, the surface portion 3 having the composition where the ratio $z_2/z_1$ falls within the range of 0.8 to 0.995 can be provided on the surface of the magnet main body 2 made of the sintered compact. If the heat treatment temperature and the heat treatment time are insufficient, the diffusion of the element R and the generation of the compound cannot fully progress, so that the ratio $z_2/z_1$ in the surface portion 3 cannot be controlled to the predetermined range.

An example of a method of giving the difference in the concentration of the element M is a method in which a plurality of alloy powders different in the concentration of the element M are sequentially put into a mold and they are press-formed in the step of fabricating the compressed powder body. For example, alloy powder 1 in which the content of the element M is set to a predetermined range and alloy powder 2 in which the content of the element M is lower than that in the allow powder 1 are prepared. First, the alloy powder 2 is put into the mold, next the alloy powder 1 is put therein, and the alloy powder 2 is finally put therein again. By the press forming in this state, the compressed powder body in whose upper and lower surfaces, portions having a low concentration of the element M are provided is obtained. By sintering such a compressed powder body, it is possible to obtain the sintered compact in which the surface portion 3 low in the concentration of the element M is provided on the surface of the magnet main body 2 having the predetermined concentration of the element M.

The sintered compact having the concentration difference of the element R and the concentration difference of the element M can be obtained by applying the combination of the above-described methods. By adjusting conditions of the heat treatment performed after the deposition of the element R or the application of the compound powder containing the element R, it is also possible to give the concentration difference of the element R and the concentration difference of the element M simultaneously. The methods described here are examples, and any of the methods may be employed, provided that the sintered compact having the concentration difference of the element R between the interior and the surface portion, and further the sintered compact having the concentration difference of the element M can be obtained. Then, by subjecting such a sintered compact to the aforesaid solution treatment and aging, it is possible to obtain the permanent magnet 1 having the magnet main body (interior) 2 and the surface portion 3 which are different in the composition while maintaining a high coercive force and high magnetic flux density. The solution treatment may be performed in advance before the process of giving the concentration differences of the element R and the element M is performed.

The permanent magnet of this embodiment is usable in various kinds of motors and power generators. The permanent magnet of the embodiment is also usable as a stationary magnet and a variable magnet of a variable magnetic flux motor and a variable magnetic flux power generator. Various kinds of motors and power generators are structured by the use of the permanent magnet of this embodiment. When the permanent magnet of this embodiment is applied to a variable magnetic flux motor, arts disclosed in Japanese Patent Application Laid-open No. 2008-29148 and Japanese Patent Application Laid-open No. 2008-43172 are applicable as a structure and a drive system of the variable magnetic flux motor.

Figure 2:
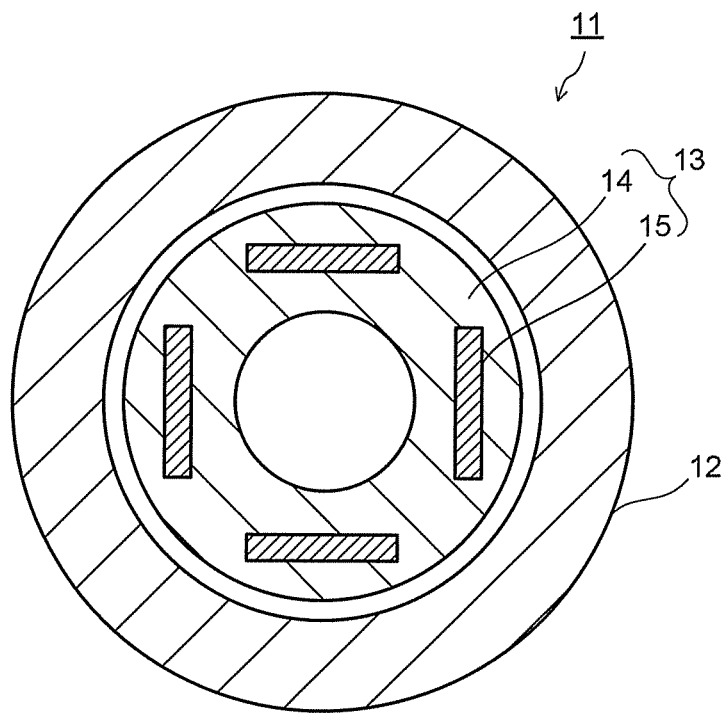
FIG. 2 is a view showing a permanent magnet motor of an embodiment.

Next, a motor and a power generator of embodiments will be described with reference to the drawings. FIG. 2 shows a permanent magnet motor according to an embodiment. In the permanent magnet motor 11 shown in FIG. 2, a rotor (rotating part) 13 is disposed in a stator (stationary part) 12. In an iron core 14 of the rotor 13, the permanent magnets 15 of the embodiment are disposed. Based on the properties and so on of the permanent magnets of the embodiment, it is possible to realize efficiency enhancement, downsizing, cost reduction, and so on of the permanent magnet motor 11.

Figure 3:
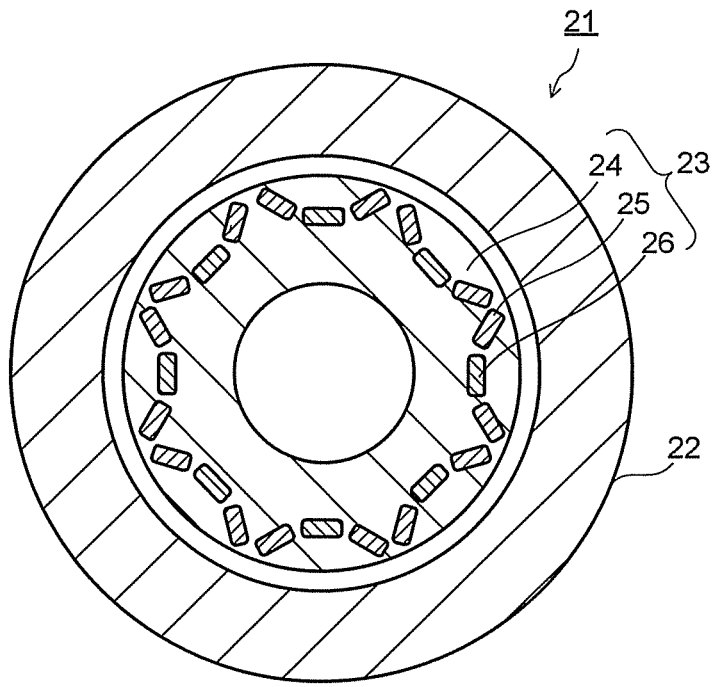
FIG. 3 is a view showing a variable magnetic flux motor of an embodiment.

FIG. 3 shows a variable magnetic flux motor according to an embodiment. In the variable magnetic flux motor 21 shown in FIG. 3, a rotor (rotating part) 23 is disposed in a stator (stationary part) 22. In an iron core 24 of the rotor 23, the permanent magnets of the embodiment are disposed as stationary magnets 25 and variable magnets 26. Magnetic flux density (flux quantum) of the variable magnets 26 is variable. The variable magnets 26 are not influenced by a Q-axis current because their magnetization direction is orthogonal to a Q-axis direction, and can be magnetized by a D-axis current. In the rotor 23, a magnetized winding (not shown) is provided. When a current is passed through the magnetized winding from a magnetizing circuit, its magnetic field acts directly on the variable magnets 26.

According to the permanent magnet of the embodiment, it is possible to obtain, for example, the stationary magnets 25 whose coercive force is over 500 kA/m and the variable magnets 26 whose coercive force is 500 kA/m or less, by changing the various conditions of the aforesaid manufacturing method. In the variable magnetic flux motor 21 shown in FIG. 3, the permanent magnets of the embodiment are usable as both of the stationary magnets 25 and the variable magnets 26, but the permanent magnets of the embodiment may be used as either of the magnets. The variable magnetic flux motor 21 is capable of outputting a large torque with a small device size and thus is suitable for motors of hybrid vehicles, electric vehicles, and the like whose motors are required to have a high output and a small size.

Figure 4:
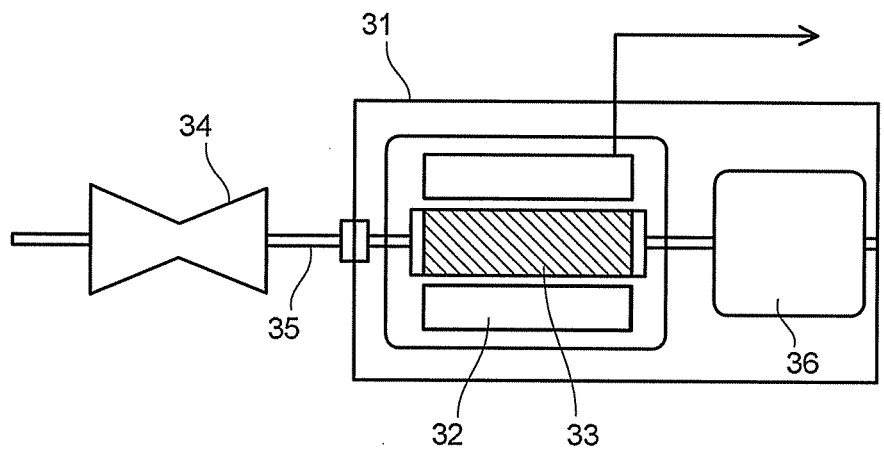
FIG. 4 is a view showing a power generator of an embodiment.

FIG. 4 shows a power generator according to an embodiment. The power generator 31 shown in FIG. 4 includes a stator (stationary part) 32 using the permanent magnet of the embodiment. A rotor (rotating part) 33 disposed inside the stator (stationary part) 32 is connected via a shaft 35 to a turbine 34 provided at one end of the power generator 31. The turbine 34 rotates by an externally supplied fluid, for instance. Incidentally, instead of the turbine 34 rotating by the fluid, it is also possible to rotate the shaft 35 by the transmission of dynamic rotation such as regenerative energy of a vehicle. As the stator 32 and the rotor 33, various kinds of generally known structures are adoptable.

The shaft 35 is in contact with a commutator (not shown) disposed on the rotor 33 opposite the turbine 34, and an electromotive force generated by the rotation of the rotor 33 is boosted to system voltage to be transmitted as an output of the power generator 31 via an isolated phase bus and a traction transformer (not shown). The power generator 31 may be either of an ordinary power generator and a variable magnetic flux power generator. Note that the rotor 33 is electrically charged due to an axial current accompanying static electricity from the turbine 34 and the power generation. Therefore, the power generator 31 includes a brush 36 for discharging the charged electricity of the rotor 33.

Next, examples and their evaluation results will be described.

Examples 1 to 8

After raw materials were weighed and mixed at predetermined ratios, the resultants were arc-melted in an Ar gas atmosphere, whereby alloy ingots were fabricated. After the alloy ingots were roughly ground, they were finely ground by a jet mill, whereby alloy powders were prepared. Next, after the alloy powders were press-formed in a magnetic field into compressed powder bodies, they were sintered while kept in an Ar gas atmosphere at 1200° C. for two hours, and subsequently were subjected to solution treatment while kept at 1130° C. for three hours, whereby sintered compacts were fabricated.

Next, after Sm was deposited on surfaces of the obtained sintered compacts, they were kept in the Ar gas atmosphere at 700° C. for one hour to be heat-treated, whereby Sm was diffused from the surfaces to give a difference in Sm concentration between the interiors and surface portions. The deposition of Sm on the surfaces of the sintered compacts was performed by a physical vapor deposition method in which Sm metal powder whose grain diameter was 250 μm or less was evaporated by heating and this Sm vapor was adsorbed on the surfaces of the sintered compacts. The sintered compacts each thus given the Sm concentration difference between the interior and the surface portion were kept in the Ar gas atmosphere at 790° C. for four hours and thereafter were gradually cooled to 400° C., and further were cooled to room temperature. Sintered magnets thus obtained were subjected to later-described physical property evaluation.

Comparative Example 1

A sintered magnet was fabricated in the same manner as in the example 1 except that the deposition of Sm on the surface of the sintered compact and the later heat treatment were not performed. The obtained sintered magnet was subjected to the later-described physical property evaluation.

Comparative Example 2

A sintered magnet was fabricated in the same manner as in the example 1 except that after Sm was deposited on the surface of the sintered compact, it was kept in an Ar gas atmosphere at 400° C. for one hour to be heat-treated. The obtained sintered magnet was subjected to the later-described physical property evaluation.

The compositions in the interior and the surface portion of each of the sintered magnets of the examples 1 to 8 and the comparative examples 1 to 2 were measured by the aforesaid method. Composition analysis was conducted for four places in the interior and four places in the surface portion, and average values thereof are shown in Table 1 as the composition in the interior and the composition in the surface portion. Next, magnetic properties of each of the sintered magnets at room temperature were evaluated by a BH tracer and a coercive force and residual magnetization were measured. Further, each of the sintered magnets was buried in an IPM motor and a demagnetization state at 150° C. was examined. The results are shown in Table 2. In the evaluation results of the demagnetization state at 150° C., those where a region with the demagnetization of more than 5% was confirmed are shown as "no good", those where a region with the demagnetization of more than 5% was not confirmed are shown as "good", and those where a region with the demagnetization of more than 1% was not confirmed are shown as "very good".

TABLE 1

| | Composition of Magnet (atomic ratio) | |
|---|---|---|
| | Composition in Interior | Composition in Surface Portion |
| Example 1 | $Sm(Fe_{0.30}Zr_{0.017}Cu_{0.057}Co_{bal.})_{7.88}$ | $Sm(Fe_{0.30}Zr_{0.017}Cu_{0.057}Co_{bal.})_{7.77}$ |
| Example 2 | $Sm(Fe_{0.33}Zr_{0.020}Cu_{0.063}Co_{bal.})_{7.82}$ | $Sm(Fe_{0.32}Zr_{0.020}Cu_{0.060}Co_{bal.})_{7.22}$ |
| Example 3 | $Sm(Fe_{0.34}Zr_{0.019}Cu_{0.055}Co_{bal.})_{7.95}$ | $Sm(Fe_{0.34}Zr_{0.020}Cu_{0.057}Co_{bal.})_{7.72}$ |
| Example 4 | $(Sm_{0.92}Ce_{0.08})(Fe_{0.28}Zr_{0.022}Cu_{0.055}Co_{bal.})_{8.08}$ | $(Sm_{0.92}Ce_{0.08})(Fe_{0.31}Zr_{0.022}Cu_{0.056}Co_{bal.})_{7.25}$ |
| Example 5 | $(Sm_{0.97}Nd_{0.03})(Fe_{0.29}Zr_{0.018}Cu_{0.056}Co_{bal.})_{7.73}$ | $(Sm_{0.97}Nd_{0.03})(Fe_{0.28}Zr_{0.019}Cu_{0.055}Co_{bal.})_{7.44}$ |
| Example 6 | $(Sm_{0.96}Pr_{0.04})(Fe_{0.32}Zr_{0.019}Cu_{0.058}Co_{bal.})_{7.91}$ | $(Sm_{0.96}Pr_{0.04})(Fe_{0.32}Zr_{0.019}Cu_{0.056}Co_{bal.})_{7.32}$ |
| Example 7 | $Sm(Fe_{0.34}(Zr_{0.95}Hf_{0.05})_{0.020}Cu_{0.058}Co_{bal.})_{7.82}$ | $Sm(Fe_{0.33}(Zr_{0.95}Hf_{0.05})_{0.020}Cu_{0.058}Co_{bal.})_{7.77}$ |
| Example 8 | $Sm(Fe_{0.30}(Zr_{0.97}Ti_{0.03})_{0.016}Cu_{0.054}Co_{bal.})_{7.95}$ | $Sm(Fe_{0.29}(Zr_{0.97}Ti_{0.03})_{0.017}Cu_{0.052}Co_{bal.})_{7.80}$ |
| Comparative Example 1 | $Sm(Fe_{0.30}Zr_{0.017}Cu_{0.057}Co_{bal.})_{7.89}$ | $Sm(Fe_{0.30}Zr_{0.017}Cu_{0.056}Co_{bal.})_{7.98}$ |
| Comparative Example 2 | $Sm(Fe_{0.30}Zr_{0.017}Cu_{0.057}Co_{bal.})_{7.86}$ | $Sm(Fe_{0.32}Zr_{0.018}Cu_{0.055}Co_{bal.})_{6.22}$ |

TABLE 2

| | z2/z1 | Coercive Force [kA/m] | Residual Magnetization [T] | Demagnetization State |
|---|---|---|---|---|
| Example 1 | 0.986 | 1450 | 1.202 | Very Good |
| Example 2 | 0.923 | 1410 | 1.215 | Very Good |
| Example 3 | 0.971 | 1355 | 1.221 | Good |
| Example 4 | 0.897 | 1510 | 1.207 | Very Good |
| Example 5 | 0.962 | 1330 | 1.210 | Good |
| Example 6 | 0.925 | 1365 | 1.218 | Good |
| Example 7 | 0.994 | 1400 | 1.217 | Good |
| Example 8 | 0.981 | 1405 | 1.208 | Very Good |
| Comparative Example 1 | 1.011 | 1415 | 1.208 | No Good |
| Comparative Example 2 | 0.791 | 1450 | 1.177 | Very Good |

As is apparent from Table 2, the sintered magnets of the examples 1 to 8 are all excellent in the magnetic properties and the occurrence of the high-temperature demagnetization is also suppressed therein. On the other hand, in the sintered magnet of the comparative example 1, the occurrence of the region with about 5% demagnetization was confirmed in a corner portion. In the sintered magnet of the comparative example 2, though the occurrence of the high-temperature demagnetization was suppressed, the residual magnetization deteriorated because the Sm concentration in the surface portion became too high due to the insufficient heat treatment condition after the deposition of Sm.

Examples 9 to 13

After raw materials were weighed and mixed at predetermined ratios, the resultants were arc-melted in an Ar gas atmosphere, whereby alloy ingots were fabricated. After the alloy ingots were roughly ground, they were finely ground by a jet mill, whereby alloy powders 1 were prepared. Further, alloy powders 2 each having a low Zr concentration were prepared in the same manner. The alloy powders 2 each were put into a mold, and then the allow powders 1 each were put therein, and after the alloy powders 2 each were finally put therein again, the resultants were press-formed in a magnetic field into compressed powder bodies. The compressed powder bodies were sintered while kept in an Ar gas atmosphere at 1200° C. for two hours, and subsequently were kept at 1130° C. for three hours, whereby sintered compacts were fabricated.

Next, after Sm was deposited on surfaces of the obtained sintered compacts, they were kept in the Ar gas atmosphere at 900° C. for one hour to be heat-treated, whereby Sm was diffused from the surfaces to give differences in Sm concentration between the interiors and surface portions. The deposition of Sm on the surfaces of the sintered compacts was performed by a physical vapor deposition method in which Sm metal powder whose grain diameter was 250 µm or less was evaporated by heating and this Sm vapor was adsorbed on the surfaces of the sintered compacts. The sintered compacts each thus given the Sm concentration difference and the Zr concentration difference between the interior and the surface portion were kept in the Ar gas atmosphere at 790° C. for four hours and thereafter were gradually cooled to 400° C., and further were cooled to room temperature. Sintered magnets thus obtained were subjected to the physical property evaluation.

The compositions in the interior and the surface portion of each of the sintered magnets of the above-described examples 9 to 13 were measured by the aforesaid method. Composition analysis was conducted for four places in the interior and four places in the surface portion, and average values thereof are shown in Table 3 as the composition in the interior and the composition in the surface portion. Next, the magnetic properties of each of the sintered magnets at room temperature were evaluated by a BH tracer and a coercive force and residual magnetization were measured. Further, each of the sintered magnets was buried in an IPM motor and a demagnetization state at 150° C. was examined. The results are shown in Table 4. The evaluation results of the demagnetization state at 150° C. are based on the same evaluation criteria as that of Table 1.

TABLE 3

| | Composition of Magnet (atomic ratio) | |
|---|---|---|
| | Composition in Interior | Composition in Surface Portion |
| Example 9 | $Sm(Fe_{0.30}Zr_{0.017}Cu_{0.057}Co_{bal.})_{7.88}$ | $Sm(Fe_{0.30}Zr_{0.015}Cu_{0.058}Co_{bal.})_{7.73}$ |
| Example 10 | $Sm(Fe_{0.33}Zr_{0.021}Cu_{0.063}Co_{bal.})_{7.83}$ | $Sm(Fe_{0.32}Zr_{0.016}Cu_{0.060}Co_{bal.})_{7.41}$ |
| Example 11 | $(Sm_{0.92}Ce_{0.08})(Fe_{0.28}Zr_{0.022}Cu_{0.055}Co_{bal.})_{8.05}$ | $(Sm_{0.92}Ce_{0.08})(Fe_{0.30}Zr_{0.020}Cu_{0.056}Co_{bal.})_{7.33}$ |
| Example 12 | $(Sm_{0.97}Nd_{0.03})(Fe_{0.29}Zr_{0.019}Cu_{0.056}Co_{bal.})_{7.76}$ | $(Sm_{0.97}Nd_{0.03})(Fe_{0.28}Zr_{0.018}Cu_{0.055}Co_{bal.})_{7.44}$ |
| Example 13 | $Sm(Fe_{0.34}(Zr_{0.95}Hf_{0.05})_{0.021}Cu_{0.058}Co_{bal.})_{7.92}$ | $Sm(Fe_{0.33}(Zr_{0.95}Hf_{0.05})_{0.017}Cu_{0.058}Co_{bal.})_{7.76}$ |

TABLE 4

| | z2/z1 | q2/q1 | Coercive Force [kA/m] | Residual Magnetization [T] | Magnetization state |
|---|---|---|---|---|---|
| Example 9 | 0.981 | 0.882 | 1505 | 1.204 | Very Good |
| Example 10 | 0.946 | 0.762 | 1430 | 1.218 | Very Good |
| Example 11 | 0.911 | 0.909 | 1510 | 1.212 | Very Good |
| Example 12 | 0.959 | 0.947 | 1415 | 1.212 | Very Good |
| Example 13 | 0.980 | 0.810 | 1420 | 1.218 | Very Good |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet, comprising:
   a magnet main body having a composition expressed by a composition formula 1:
   $R(Fe_{p1}M_{q1}Cu_{r1}Co_{1-p1-q1-r1})_{z1}$
   where, R is at least one element selected from rare-earth elements,
   M is at least one element selected from Ti, Zr, and Hf,
   p1 is a number satisfying 0.25≤p1≤0.45 (atomic ratio),
   q1 is a number satisfying 0.01≤q1≤0.05 (atomic ratio),
   r1 is a number satisfying 0.01≤r1≤0.1 (atomic ratio), and
   z1 is a number satisfying 6≤z1≤9 (atomic ratio); and
   a surface portion, provided on a surface of the magnet main body, having a composition expressed by a composition formula 2:
   $R(Fe_{p2}M_{q2}Cu_{r2}Co_{1-p2-q2-r2})_{z2}$
   where, R is at least one element selected from rare-earth elements,
   M is at least one element selected from Ti, Zr, and Hf,
   p2 is a number satisfying 0.25≤p2≤0.45 (atomic ratio),
   q2 is a number satisfying 0.01≤q2≤0.05 (atomic ratio),
   r2 is a number satisfying 0.01≤r2≤0.1 (atomic ratio), and
   z2 is a number satisfying 0.8≤z2/z1≤0.995 (atomic ratio).

2. The permanent magnet according to claim 1, wherein at least part of the surface portion has a composition where q2 in the composition formula 2 satisfies 0.5≤q2/q1≤0.95.

3. The permanent magnet according to claim 1, wherein the magnet main body comprises a metallic structure including a cell phase having a $Th_2Zn_{17}$ crystal phase, and a cell wall phase surrounding the cell phase.

4. The permanent magnet according to claim 3, wherein the magnet main body is provided with a sintered compact comprising the metallic structure.

5. The permanent magnet according to claim 1, which is provided with a sintered compact comprising a metallic structure including a cell phase having a $Th_2Zn_{17}$ crystal phase, and a cell wall phase surrounding the cell phase,
   wherein the sintered compact comprises, as the surface portion, a diffusion layer having the element R diffused from a surface of the sintered compact so that a concentration of the element R in the surface portion becomes higher than that in the magnet main body.

6. The permanent magnet according to claim 1, wherein 50% or more of the element R in the composition formula 1 and the composition formula 2 is Sm.

7. The permanent magnet according to claim 1, wherein 50% or more of the element M in the composition formula 1 and the composition formula 2 is Zr.

8. The permanent magnet according to claim 1, wherein 20 at % or less of Co in at least one of the composition formula 1 and the composition formula 2 is substituted for by at least one element A selected from Ni, V, Cr, Mn, Al, Ga, Nb, Ta, and W.

9. A motor comprising the permanent magnet according to claim 1.

10. A power generator comprising the permanent magnet according to claim 1.

* * * * *